United States Patent
Li et al.

(10) Patent No.: US 12,310,809 B2
(45) Date of Patent: May 27, 2025

(54) ORAL CARE DEVICE

(71) Applicant: Shenzhen Soocas Technology Co., Ltd., Shenzhen (CN)

(72) Inventors: Junhui Li, Shenzhen (CN); Fandi Meng, Shenzhen (CN)

(73) Assignee: Shenzhen Soocas Technology Co., Ltd., Shenzhen (CN)

( * ) Notice: Subject to any disclaimer, the term of this patent is extended or adjusted under 35 U.S.C. 154(b) by 199 days.

(21) Appl. No.: 18/178,021

(22) Filed: Mar. 3, 2023

(65) Prior Publication Data

US 2024/0041581 A1   Feb. 8, 2024

(30) Foreign Application Priority Data

Aug. 5, 2022 (CN) ......................... 202210944150.2

(51) Int. Cl.
*A61C 17/36* (2006.01)
*A61C 17/22* (2006.01)

(52) U.S. Cl.
CPC ............ *A61C 17/36* (2013.01); *A61C 17/222* (2013.01); *A61C 17/227* (2013.01); *A61C 2204/002* (2013.01)

(58) Field of Classification Search
CPC ..... A61C 17/36; A61C 17/222; A61C 17/225; A61C 2204/002
See application file for complete search history.

(56) References Cited

U.S. PATENT DOCUMENTS

| 8,522,384 | B2 | 9/2013 | Leung |
| 11,399,925 | B2 | 8/2022 | Sokol et al. |
| 2005/0272001 | A1 | 12/2005 | Blain |
| 2005/0281758 | A1 | 12/2005 | Dodd |
| 2010/0284728 | A1 | 11/2010 | Heil |
| 2011/0214240 | A1 | 9/2011 | Jimenez et al. |
| 2016/0151133 | A1 | 6/2016 | Luettgen |
| 2017/0007384 | A1 | 1/2017 | Wagner |

(Continued)

FOREIGN PATENT DOCUMENTS

| CN | 205568226 U | 9/2016 | |
| CN | 106231956 B | * 7/2019 | ......... A46B 11/0003 |
| CN | 214049160 U | * 8/2021 | |

(Continued)

OTHER PUBLICATIONS

The search report of CN patent application No. 2022109441502 issued on Mar. 22, 2024.

(Continued)

*Primary Examiner* — Shay Karls

(74) *Attorney, Agent, or Firm* — Andrew C. Cheng

(57) ABSTRACT

The present disclosure provides an oral care device. The oral care device includes a handle part and a care head part; the handle part includes: a sonic motor including a motor body and a power output shaft, a fluid mechanism provided with a fluid inlet and a fluid outlet, and a housing including a machine mounting part and a water storage cavity. By using the oral care device provided by the present disclosure, the reasonable layout of a rinsing flow path can be achieved, the overall size of the oral care device can be reduced, it is convenient for a user to perform an operation, and the comfort level provided for a user during use can be improved.

20 Claims, 10 Drawing Sheets

(56) References Cited

U.S. PATENT DOCUMENTS

2018/0008388 A1 1/2018 Lee
2022/0211166 A1 7/2022 Wagner

FOREIGN PATENT DOCUMENTS

| CN | 114010355 A | 2/2022 |
|---|---|---|
| CN | 216724839 U | 6/2022 |
| RU | 2673202 C1 | 11/2018 |
| RU | 2688392 C2 | 5/2019 |
| WO | 2017081023 A1 | 5/2017 |
| WO | 2018065747 A1 | 4/2018 |

OTHER PUBLICATIONS

The supplemental search report of CN patent application No. 2022109441502 issued on Jul. 25, 2024.
The office action of JP patent application No. 2023-033772 issued on Mar. 5, 2024.
The partial European search report of EP patent application No. 23159567.9 issued on Jan. 2, 2024.
The extended European search report of EP patent application No. 23159567.9 issued on Apr. 23, 2024.
First Office Action of RU patent application No. 2023104863/14(010495) issued on Jun. 6, 2023.

\* cited by examiner

ORAL CARE DEVICE

CROSS-REFERENCE TO RELATED APPLICATIONS

This application claims the benefit of Chinese Application No. 202210944150.2, filed on Aug. 5, 2022. The entire disclosure of the above application is incorporated herein by reference.

TECHNICAL FIELD

The present disclosure relates to the technical field of oral cleaning, in particular to an oral care device.

BACKGROUND

A sonic motor assembly unit includes a motor, an eccentric driving shaft, an output shaft, the output shaft being operably connected to the motor, and a power transmission system assembly, the power transmission system assembly being connected between the eccentric driving shaft and the output shaft. A power transmission system converts rotation of the eccentric driving shaft into an oscillatory motion of the output shaft.

In the above-mentioned solution, eccentric rotation of a shaft lever on a front end of the motor is transmitted to a middle hollow shaft lever end by an eccentric mechanism, so that the shaft lever thereof vibrates. This solution has the defect that the shaft lever of the motor and a hollow shaft lever are not concentric, which causes superfluous vibration. A principle of a balance weight is applied as a principle of balance. By reasonably distributing weights, a brush head is balanced in theory, so that centrifugal forces of the brush head in the horizontal and vertical directions during work are approximately balanced.

Furthermore, there is a lack of an oral care device not only capable of achieving a toothbrushing function, but also capable of achieving a rinsing effect in the prior art. Even if there is an oral care device having toothbrushing and rinsing functions at the same time, a motor providing kinetic energy for a rinsing liquid is required to be additionally disposed in addition to a motor providing kinetic energy for toothbrushing; moreover, in order to avoid interference between the motor and a rinsing pipeline, the rinsing pipeline has to be disposed on an outer side of the motor providing kinetic energy for toothbrushing; in this way, not only is an additional implementation pipeline needed, but also an additional volume can be increased, so that the oral care device is increased in size, inconvenient to hold with a hand and operate and reduced in comfort level provided for a user during use.

SUMMARY

A main objective of the present disclosure is to provide an oral care device, by which the reasonable layout of a rinsing flow path can be achieved, the overall size of the oral care device can be reduced, it is convenient for a user to perform an operation, and the comfort level provided for a user during use can be improved.

In order to achieve the above-mentioned objective, according to a first aspect of the present disclosure, provided is an oral care device including a handle part and a care head part; wherein the handle part is configured to be suitable for hand-holding and includes:

a sonic motor including a motor body and a power output shaft, the motor body having an output axis extending in a power output direction; the power output shaft being a columnar object extending along the output axis and passing through the motor body, the power output shaft being configured to cooperate with the motor body and transmit output power from the motor body and having an axial channel parallel to the output axis as well as a first inlet and a first outlet communicating with the axial channel;

a fluid mechanism provided with a fluid inlet and a fluid outlet, the fluid outlet communicating with the first inlet; and a housing extending in the axial direction of the power output shaft and forming a cylindrical structure of which the inside is hollow, the housing including a machine mounting part and a water storage cavity, the machine mounting part being internally provided with a mounting rack, the mounting rack having a motor compartment and a pump body compartment, the sonic motor being mounted in the motor compartment, the fluid mechanism being mounted in the pump body compartment, and a head of the machine mounting part being provided with a mounting shaft hole which allows the power output shaft to penetrate through and is in an assembly fit with the power output shaft;

wherein the care head part is provided with a rinsing stem parallel to the output axis and a brush head disposed on a head of the rinsing stem, the rinsing stem is mounted on the power output shaft, the brush head includes bristles and a spray nozzle, the bristles extend in a direction which forms a preset included angle with the output axis, and the rinsing stem is provided with a fluid channel capable of communicating the spray nozzle with the axial channel;

in the extension direction of the output axis, the first outlet of the axial channel is capable of communicating with the fluid channel of the care head part, and during use of the oral care device, water in the water storage cavity can enter the axial channel from the first inlet of the axial channel under the action of the fluid mechanism, flow from a first end to a second end of the motor body via the axial channel, then, enter the fluid channel of the care head part from the first outlet of the axial channel and be sprayed out of the brush head of the care head part.

Further, the power output shaft has a Rockwell hardness HRC ranging from 17 to 70 and a single-sided wall thickness ranging from 0.3 mm to 1 mm.

Further, in a section perpendicular to the output axis, a ratio of a sectional area of the power output shaft to a sectional area of the axial channel ranges from 1.5 to 9, a single-sided wall thickness of the power output shaft ranges from 0.3 mm to 1 mm, and an internal diameter of the axial channel ranges from 0.5 mm to 3 mm.

Further, the handle part further includes:

a front damping cushion sleeving on a front end of the sonic motor, the front end of the sonic motor being mounted in the machine mounting part by the front damping cushion; and a rear damping cushion sleeving on a rear end of the sonic motor, the rear end of the sonic motor being mounted in the motor compartment by the rear damping cushion;

wherein multi-point elastic contact is formed between the periphery of the mounting rack and an inner wall of the machine mounting part.

Further, the mounting rack includes a mounting base, the mounting base is provided with the motor compartment, two opposite sides of the mounting base are respectively provided with mounting side plates facing away from each other, edges, away from the mounting base, of the mounting side plates are provided with first elastic bosses; and through grooves passing through each of the mounting side plates in the thickness direction are formed in the mounting side plates, and connecting arms located on sides, away from the mounting base, of the through grooves protrude in a direction away from the mounting base to form the first elastic bosses.

Further, an inner wall of the machine mounting part is provided with mounting grooves extending in a mounting direction of the mounting rack, the mounting side plates are clamped in the mounting grooves, two opposite side walls of each of the mounting side plates are provided with second elastic bosses protruding towards side walls of the mounting grooves, and multi-point elastic contact is formed between the mounting side plates and the side walls of the mounting grooves by the second elastic bosses.

Further, the front damping cushion has a damping plane, an inner wall of the machine mounting part is provided with first strip-shaped walls protruding towards the damping plane, the first strip-shaped walls are tightly pressed and fitted to the damping plane, the rear damping cushion is provided with a damping boss on a side where the damping plane is located, the inner wall of the machine mounting part is provided with second strip-shaped walls protruding towards the damping boss, and the second strip-shaped walls are tightly pressed and fitted to the damping boss.

Further, on a side opposite to the damping plane, two side edges of both the front damping cushion and the rear damping cushion are provided with supporting planes, the inner wall of the machine mounting part is provided with third strip-shaped walls protruding towards the supporting planes, and the third strip-shaped walls are tightly pressed and fitted to the supporting planes of both the front damping cushion and the rear damping cushion.

Further, the fluid mechanism includes a casing and a fluid pump located in the casing, the fluid pump is located between the fluid inlet and the fluid outlet, the fluid inlet communicates with a suction inlet of the fluid pump, and the fluid outlet communicates with a pump outlet of the fluid pump.

Further, an outlet end of the fluid mechanism is provided with a fluid delivery shaft, the fluid delivery shaft is provided with a fluid channel, the fluid channel communicates with the fluid outlet, and the fluid delivery shaft communicates with the power output shaft by a connector.

Further, the connector has a communication cavity, a first end facing the power output shaft and a second end facing the fluid mechanism, a first end of the power output shaft extends into the first end of the connector, and an end of the fluid mechanism where the fluid outlet is located extends into the second end of the connector.

Further, the communication cavity includes a first communication segment communicating with the first inlet and a second communication segment communicating with the fluid outlet, the first communication segment communicates with the second communication segment, an end part of the first communication segment is provided with a first sealing groove, an end part of the second communication segment is provided with a second sealing groove, and each of the first sealing groove and the second sealing groove is provided with a sealing element therein.

Further, the first communication segment and the second communication segment are disposed in a staggered manner, the connector is provided with an avoidance groove on one side of the first communication segment, the connector is provided with adjusting grooves on two opposite sides of the second communication segment, and the connector has the same wall thickness on both sides of each of the adjusting grooves.

Further, the care head part further includes a connecting structure configured to be capable of transmitting a driving force of the power output shaft to the rinsing stem, the connecting structure is disposed on an end, away from the brush head, of the rinsing stem and is capable of being snap-fitted with the power output shaft to limit axial movement of the power output shaft relative to the rinsing stem.

Further, the periphery of the power output shaft is provided with a clamping groove extending in the circumferential direction of the power output shaft, the connecting structure includes:
 a connecting support having an internal through hole parallel to the output axis, wherein the power output shaft can be inserted in the internal through hole; and
 a clamping piece disposed on the connecting support, the clamping piece including two clamping arms spaced apart in the radial direction of the power output shaft, and the two clamping arms having a clamping position, in which the two clamping arms are close to each other and become snap-fitted with the clamping groove, and an unclamping position, in which the two clamping arms are away from each other and become not snap-fitted with the clamping groove.

Further, the clamping piece further includes an elastic arm for connecting the two clamping arms so that the two clamping arms can be switched from the unclamping position to the clamping position.

Further, the connecting support is provided with a mounting via groove communicating with the internal through hole, and the mounting via groove passes through the connecting support in the radial direction of the power output shaft; and inner walls on circumferential sides of the mounting via groove are in clearance fit with the clamping arms.

Further, the clamping piece further includes an elastic arm for connecting the two clamping arms, the connecting structure further includes a retaining rib connected to the connecting support, one end of the mounting via groove is provided with the retaining rib, and the elastic arm is partially located on a side, facing away from the internal through hole, of the retaining rib so that the displacement of the elastic arm is limited thereby.

Further, the connecting structure further includes a locating rib disposed on the other end of the mounting via groove, the clamping piece further includes two locating arms respectively connected to the two clamping arms, and the two locating arms are spaced apart and are located on two sides of the locating rib.

Further, the rinsing stem is provided with a mounting through hole communicating with the fluid channel, a step surface is disposed between the mounting through hole and the fluid channel, and the connecting structure is located in the mounting through hole and is constrained between the step surface and an end face of the housing.

Further, the care head part further includes a limiting groove disposed in the rinsing stem and a limiting rib disposed on the connecting support of the connecting structure, the limiting groove communicates with the mounting through hole, and the limiting rib is constrained by and cooperates with the limiting groove.

By applying the technical solutions in the present disclosure, for the oral care device, the power output shaft of the sonic motor is disposed as the columnar object extending along the output axis and passing through the motor body and is enabled to form the axial channel parallel to the output axis; when a fluid pumped out of the fluid mechanism reaches a position where the sonic motor is located, a pipe is not needed to be disposed outside the sonic motor, but can be directly connected to the power output shaft of the sonic motor, so that the fluid outlet of the fluid mechanism communicates with the axial channel of the power output shaft, and then, the fluid can be delivered by the axial channel of the power output shaft; and the structure of the sonic motor can be more sufficiently and reasonably utilized, so that the structural layout of a rinsing flow path is more reasonable, fluid pipelines are reduced, the occupied space is saved, and the oral care device is smaller in overall size and lighter in weight; and the handle part can be made thinner so as to be more convenient to hold with a hand and be convenient for a user to operate, and thus, the comfort level provided for a user during use can be improved.

BRIEF DESCRIPTION OF THE DRAWINGS

The accompanying drawings of the description constituting one part of the present application are provided for further understanding of the present disclosure. Illustrative embodiments of the present disclosure and the descriptions thereof are intended to explain the present disclosure, rather than to limit the present disclosure in any inappropriate manner. In the accompanying drawings.

Figure 1:
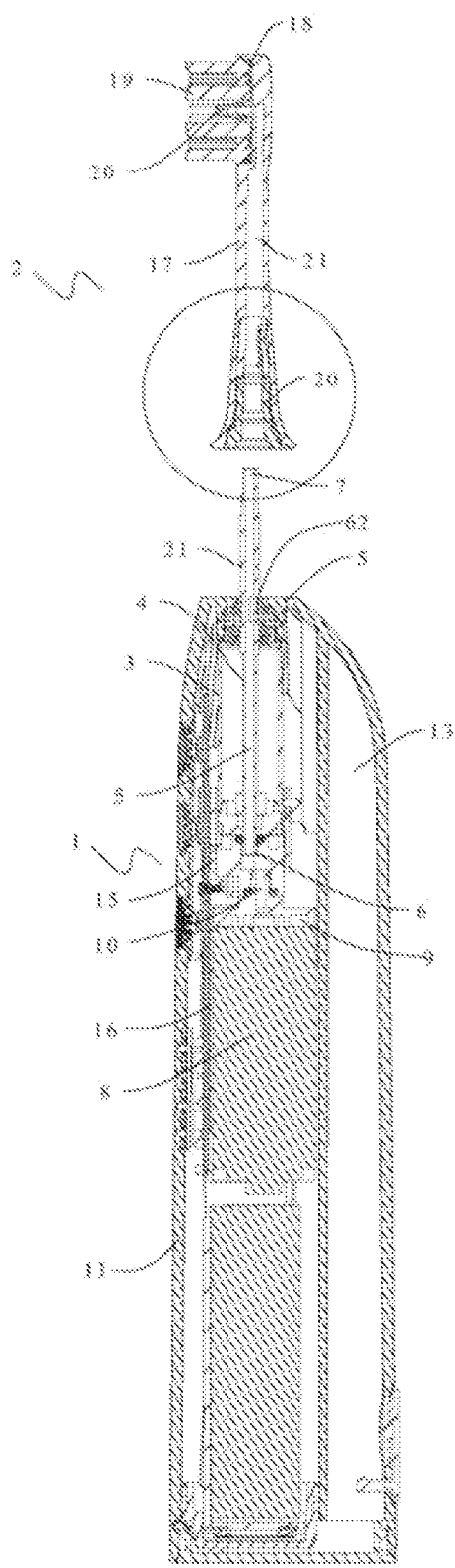
FIG. 1 shows a schematic structural view of an oral care device in an embodiment of the present disclosure.

The following reference signs are included in the above-mentioned accompanying drawings:

1, handle part; 2, care head part; 3, motor body; 4, power output shaft; 5, axial channel; 6, first inlet; 7, first outlet; 8, fluid mechanism; 9, fluid inlet; 10, fluid outlet; 11, housing; 12, machine mounting part; 13, water storage cavity; 14, mounting rack; 15, motor compartment; 16, pump body compartment; 17, rinsing stem; 18, brush head; 19, bristle; 20, spray nozzle; 21, fluid channel; 22, front damping cushion; 23, rear damping cushion; 24, mounting base; 25, mounting side plate; 26, first elastic boss; 27, through groove; 28, connecting arm; 29, mounting groove; 30, second elastic boss; 31, damping plane; 32, first strip-shaped wall; 33, damping boss; 34, second strip-shaped wall; 35, supporting plane; 36, third strip-shaped wall; 37, casing; 38, fluid pump; 39, fluid delivery shaft; 40, connector; 41, communication cavity; 42, first communication segment; 43, second communication segment; 44, first sealing groove; 45, second sealing groove; 46, sealing element; 47, avoidance groove; 48, adjusting groove; 49, connecting structure; 50, clamping groove; 51, connecting support; 52, clamping piece; 53, clamping arm; 54, elastic arm; 55, mounting via groove; 56, retaining rib; 57, locating rib; 58, locating arm; 59, mounting through hole; 60, limiting groove; 61, limiting rib; and 62, mounting shaft hole.

DETAILED DESCRIPTION

It should be noted that the embodiments in the present application and features in the embodiments may be combined with each other without conflicts. The present disclosure will be described in detail below with reference to the accompanying drawings and in conjunction with the embodiments.

With reference to FIG. 1 to FIG. 14, the present disclosure provides an oral care device, including a handle part 1 and a care head part 2; wherein the handle part 1 is configured to be suitable for hand-holding and includes:

a sonic motor including a motor body 3 and a power output shaft 4, the motor body 3 having an output axis extending in a power output direction; the power output shaft 4 being a columnar object extending along the output axis and passing through the motor body 3, the power output shaft 4 being configured to cooperate with the motor body 3 and transmit output power from the motor body 3 and having an axial channel 5 parallel to the output axis as well as a first inlet 6 and a first outlet 7 communicating with the axial channel 5;

a fluid mechanism 8 provided with a fluid inlet 9 and a fluid outlet 10, the fluid outlet 10 communicating with the first inlet 6; and a housing 11 extending in the axial direction of the power output shaft 4 and forming a cylindrical structure of which the inside is hollow, the housing 11 including a machine mounting part 12 and a water storage cavity 13, the machine mounting part 12 being internally provided with a mounting rack 14, the mounting rack 14 having a motor compartment 15 and a pump body compartment 16, the sonic motor being mounted in the motor compartment 15, the fluid mechanism 8 being mounted in the pump body compartment 16, and a head of the machine mounting part 12 being provided with a mounting shaft hole 62 which allows the power output shaft 4 to penetrate through and is in an assembly fit with the power output shaft 4;

wherein the care head part 2 is provided with a rinsing stem 17 parallel to the output axis and a brush head 18 disposed on a head of the rinsing stem 17, the rinsing stem 17 is mounted on the power output shaft 4, the brush head 18 includes bristles 19 and a spray nozzle 20, the bristles 19 extend in a direction which forms a preset included angle with the output axis, and the rinsing stem 17 is provided with a fluid channel 21 capable of communicating the spray nozzle 20 with the axial channel 5;

in the extension direction of the output axis, the first outlet 7 of the axial channel 5 is capable of communicating with the fluid channel 21 of the care head part 2, and during use of the oral care device, water in the water storage cavity 13 can enter the axial channel 5 from the first inlet 6 of the axial channel 5 under the action of the fluid mechanism 8, flow from a first end to a second end of the motor body 3 via the axial channel 5, then, enter the fluid channel 21 of the care head part 2 from the first outlet 7 of the axial channel 5 and be sprayed out of the brush head 18 of the care head part 2.

For the oral care device, the power output shaft 4 of the sonic motor is disposed as the columnar object extending along the output axis and passing through the motor body 3 and is enabled to form the axial channel 5 parallel to the output axis; when a fluid pumped out of the fluid mechanism 8 reaches a position where the sonic motor is located, a pipe is not needed to be disposed outside the sonic motor, but can be directly connected to the power output shaft 4 of the sonic motor, so that the fluid outlet of the fluid mechanism 8 communicates with the axial channel 5 of the power output shaft 4, then, the fluid can be delivered by the axial channel 5 of the power output shaft 4, and thus, the fluid flows through the inside of the power output shaft 4 inside the sonic motor; it is unnecessary to perform other variations in a structure of a product, no additional space is occupied, and the structure of the sonic motor can be more sufficiently and reasonably utilized, so that the structural layout of a rinsing flow path is more reasonable, fluid pipelines are reduced, the occupied space is saved, and the oral care device is smaller in overall size and lighter in weight; and the handle part 1 can be made thinner so as to be more convenient to hold with a hand and be convenient for a user to operate, and thus, the comfort level provided for a user during use can be improved.

In one embodiment, the power output shaft 4 has a Rockwell hardness HRC ranging from 17 to 70 and a single-sided wall thickness ranging from 0.3 mm to 1 mm. It is proven by practice that there are similar corresponding relationships among various hardness values of a material and between a hardness value and a strength value, the hardness value is determined by an initial plastic deformation resistance and a further plastic deformation resistance, the higher the strength of the material is, the higher the plastic deformation resistance and the hardness value are. Generally, if the material is higher in hardness, it is better in wear resistance and higher in brittleness, and therefore, in order to guarantee the hardness and toughness of the power output shaft 4 at the same time, the hardness of the power output shaft 4 has to be constrained reasonably. By setting the hardness of the power output shaft 4 within the above-mentioned range, it can be ensured that the hardness of the power output shaft 4 satisfies a power output requirement of the sonic motor, the problem that the plastic deformation of the power output shaft 4 occurs due to insufficient hardness can be effectively avoided, and meanwhile, the problem that fracture easily occurs due to overhigh brittleness caused by overhigh hardness can also be avoided, so that the power output shaft 4 can still have good hardness and toughness after the axial channel 5 is provided, the power output capacity as well as the service life and working stability of the sonic motor can be guaranteed while fluid delivery is satisfied.

A wall thickness of the power output shaft 4 is optimized within the above-mentioned hardness range, which can ensure that the wall thickness of the power output shaft 4 may be cast to be thin under the condition that the structural strength of the power output shaft 4 satisfies the requirement on the service life of the sonic motor, so that the dosage of the material is reduced, the cost of the material is reduced, the overall weight of the handle part 1 is reduced, and the overall weight of the oral care device is more suitable for a user.

The power output shaft 4 may be made by machining stainless steel which may be specifically 303 steel or 304 steel, and may also be made of other types of metallic or nonmetallic materials as long as the above-mentioned hardness requirement can be satisfied.

In one embodiment, the axial channel 5 has a circular cross section and has the diameter ranging from 2 mm to 5 mm; and the power output shaft 4 is cylindrical and has the diameter ranging from 3 mm to 6 mm. In this embodiment, the diameter of the axial channel 5 ranges from 2 mm to 5 mm, and the diameter of the power output shaft 4 ranges from 3 mm to 6 mm, which not only can ensure that the fluid in the axial channel 5 smoothly passes through the axial channel 5 to provide sufficient rinsing water for the care head part 2, but also can avoid the problems of increment of the basically required wall thickness of the power output shaft 4 and increment of the overall diameter of the sonic motor due to the overlarge diameter of the axial channel 5 and can avoid increasing the sectional area of the handle part 1, so that the handle part 1 is always convenient to hold with a hand.

In one embodiment, an inner wall of the axial channel 5 of the power output shaft 4 is subjected to surface treatment which may be finish drawing or polishing, so that the surface precision of the inner wall of the axial channel 5 can be improved, the flow resistance of the fluid can be lowered, the energy consumption of fluid delivery can be reduced, and the delivery efficiency of the fluid can be increased.

In one embodiment, in a section perpendicular to the output axis, a ratio of a sectional area of the power output shaft 4 to a sectional area of the axial channel 5 ranges from 1.5 to 9, a single-sided wall thickness of the power output shaft 4 ranges from 0.3 mm to 1 mm, and an internal diameter of the axial channel 5 ranges from 0.5 mm to 3 mm, so that there may be a good coordination relationship among the wall thickness of the power output shaft 4, the internal diameter of the axial channel 5 and the overall sectional area of the power output shaft 4, which not only can guarantee the flow resistance of the fluid in the axial channel 5, but also can ensure that the wall thickness of the power output shaft 4 satisfies the power output requirement of the power output shaft 4, and can further ensure that the diameter of the power output shaft 4 cannot be overlarge, thereby avoiding the problem that the sectional area of the handle part 1 is overlarge due to excessive increment of the diameter of the sonic motor.

In one embodiment, the axial channel 5 passes through the power output shaft 4 in the axial direction of the power output shaft 4, the first inlet 6 is located on an end, away from the care head part 2, of the axial channel 5, and the first outlet 7 is located on an end, close to the care head part 2, of the axial channel 5. In this embodiment, the axial channel 5 passes through the power output shaft 4 in the axial direction, which facilitates machining the axial channel 5 and reduces the machining difficulty of the axial channel 5 on the power output shaft 4 on one hand, and can conveniently achieve the communication and cooperation with the fluid outlet 10 of the fluid mechanism 8 and lower the cooperation difficulty on the other hand.

In one embodiment, the power output shaft 4 is of an integrally formed structure, so that the structural strength, integrality and structural consistency of the power output shaft 4 can be improved, the overall sealing performance of the power output shaft 4 can be guaranteed, meanwhile, machining processes can be reduced, and the overall structural stability can be improved.

In one embodiment, the power output shaft 4 is of a segmented structure, and segments of the power output shaft 4 are fixedly connected. Since the power output shaft 4 is of a thin-walled slender tubular structure, and a groove is required to be machined in a peripheral wall, if the power output shaft 4 is machined as a whole, the machining difficulty can be improved, and deformation is easy to occur during machining to cause a higher scrap rate; and the power output shaft 4 is designed to be segmented, i.e. the power output shaft 4 can be segmented according to functions, each segment achieves a different functional requirement, in this way, each segment of power output shaft 4 is shorter, and a slender hole required to be machined is also shorter, so that the machining difficulty can be greatly lowered, and the machining stability can also be effectively guaranteed. After the segments are machined, the segments of the power output shaft 4 can be fixedly connected together in a form of welding or bonding, thereby forming an integrated fixed structure.

In one embodiment, the power output shaft 4 includes a first shaft segment, a second shaft segment and a third shaft segment which are connected in sequence, the first shaft segment is configured to cooperate with the motor body 3, the second shaft segment is configured to cooperate with the mounting shaft hole 62, and the third shaft segment is configured to cooperate with the care head part 2. In this embodiment, the power output shaft 4 is divided into three parts according to different cooperation structures, and the three parts are fixedly connected after being machined, so that machining is facilitated, and the machining efficiency is increased.

In one embodiment, the first shaft segment has a diameter ranging from 3 mm to 3.5 mm and a wall thickness ranging from 0.5 mm to 0.75 mm, the second shaft segment has a diameter ranging from 4 mm to 6 mm and a wall thickness ranging from 1 mm to 2 mm, the third shaft segment has a diameter ranging from 3.5 mm to 6 mm and a wall thickness ranging from 0.75 mm to 2 mm, the second shaft segment is provided with a sealing groove having a depth ranging from 0.1 mm to 0.3 mm, and the third shaft segment is provided with a locating clamping groove having a depth ranging from 0.3 mm to 0.5 mm.

In this embodiment, the first shaft segment is disposed in the motor body 3 and is mainly used to rotatably cooperate with the motor body 3 and delivery the fluid, the periphery of the first shaft segment is of a smooth structure and is not required to machine a groove structure, in this way, the first shaft segment can be designed according to a smaller wall thickness capable of satisfying a requirement to satisfy a requirement on cooperation with the motor body 3, and therefore, the wall thickness of this segment is designed to be minimum; the second shaft segment is required to be in an assembly fit and sealing fit with the machine mounting part 12, in this way, a peripheral wall of the second shaft segment is required to be provided with the sealing groove, the disposing of the sealing groove may affect the structural strength of the second shaft segment, and therefore, when the second shaft segment is structurally designed, influences from the sealing groove have to be taken into account at the same time during the design of the wall thickness, the wall thickness required to be designed is required to increase depth influences of the sealing groove while satisfying a requirement on the minimum wall thickness to ensure that the disposing of the sealing groove cannot cause a situation that the second shaft segment cannot satisfy the requirement on the structural design of the power output shaft 4, and therefore, the diameter and wall thickness of the second shaft segment are greater than those of the first shaft segment; the third shaft segment is required to satisfy a requirement on an assembly fit with the care head part 2 and provide a spring clamping position for the care head part 2, and therefore, the locating clamping groove is required to be machined in the third shaft segment; and when the third shaft segment is designed, structural influences of the design of the locating clamping groove on the third shaft segment are also required to be taken into account, and therefore, the diameter of the third shaft segment is also required to be greater than the diameter of the first shaft segment. The diameters of the second shaft segment and the third shaft segment can be the same or different as along as the strength required by respective structure design can be satisfied.

In one embodiment, the oral care device further includes the fluid mechanism 8 and a battery; the fluid mechanism 8 includes the fluid inlet 9 capable of delivering an incoming flow into the fluid mechanism 8 and the fluid outlet 10 capable of delivering the incoming flow into the first inlet 6 of the axial channel 5 and further includes a power apparatus capable of providing a driving action force for the flow of the fluid; and the battery can provide energy for the power apparatus and the sonic motor and is disposed on an end, away from the sonic motor, of the fluid mechanism 8, and the sonic motor, the fluid mechanism 8 and the battery are disposed in sequence in a direction parallel to the output axis.

In this embodiment, after flowing out of the water storage cavity 13 under the driving action of the power apparatus of the fluid mechanism 8, the fluid enters the fluid mechanism 8 through the fluid inlet 9 of the fluid mechanism 8, then, flows out of the fluid mechanism 8 through the fluid outlet 10 of the fluid mechanism 8 and is delivered to the power output shaft 4, enters the axial channel 5 from the first inlet 6 of the axial channel 5 of the power output shaft 4, then, flows from the inside of the axial channel 5 to the other end of the motor body 3 and flows out of the first outlet 7 of the axial channel 5 to enter the care head part 2, and is finally sprayed out of the spray nozzle 20 of the care head part 2 to rinse an oral cavity. Furthermore, the sonic motor can output power to the care head part 2 by the power output shaft 4 and transmit the power to the brush head 18 by the rinsing stem 17 of the care head part 2, so that the brush head 18 can perform brushing under the action of the sonic motor to clean the oral cavity by virtue of the bristles 19 of the brush head 18.

The handle part 1 further includes: a front damping cushion 22 sleeving on a front end of the sonic motor, the front end of the sonic motor being mounted in the machine mounting part 12 by the front damping cushion 22; and a rear damping cushion 23 sleeving on a rear end of the sonic motor, the rear end of the sonic motor being mounted in the motor compartment 15 by the rear damping cushion 23; wherein multi-point elastic contact is formed between the periphery of the mounting rack 14 and an inner wall of the machine mounting part 12.

The sonic motor cooperates with the machine mounting part 12 by both the front damping cushion 22 and the rear damping cushion 23, by both the front damping cushion 22 and the rear damping cushion 23, it is possible that the sonic motor is not in direct contact with the machine mounting part 12 and therefore, the sonic motor can be damped by virtue of the damping performance of both the front damping cushion 22 and the rear damping cushion 23, direct contact between the sonic motor and the housing 11 can be avoided, vibration transmitted from the sonic motor to the machine mounting part 12 can be effectively reduced, vibration felt when a handle is held can be reduced, vibration noise can be reduced, and the use experience of a user can be improved.

The multi-point elastic contact is formed between the periphery of the mounting rack 14 and the inner wall of the machine mounting part 12, so that damping fit can also be formed between the mounting rack 14 and the machine mounting part 12; both the motor compartment 15 and the pump body compartment 16 are located on the mounting rack 14, and therefore, vibration of each of the sonic motor and the fluid mechanism 8 is transmitted to the machine mounting part 12 by the front damping cushion 22, the rear damping cushion 23 and the mounting rack 14; and the mounting rack 14 and the machine mounting part 12 are in multi-point contact and cooperate with both the front damping cushion 22 and the rear damping cushion 23, which ensures that the vibration can be dispersed from centralized points of vibration sources to contact points of the front damping cushion 22, the rear damping cushion 23, the mounting rack 14 and the machine mounting part 12 when being transmitted to the housing 11 by all the vibration sources, so that the vibration action is dispersed, the overall vibration effect of the machine mounting part 12 is weakened, the vibration noise is reduced, and a good damping effect is achieved.

In one embodiment, the mounting rack 14 includes a mounting base 24, the mounting base 24 is provided with the motor compartment 15, two opposite sides of the mounting base 24 are respectively provided with mounting side plates 25 facing away from each other, and edges, away from the mounting base 24, of the mounting side plates 25 are provided with first elastic bosses 26.

In this embodiment, the mounting rack 14 facilitates the mounting and fixing of a structure such as a control panel by virtue of a mounting gap formed between the mounting base 24 and the machine mounting part 12, and can provide a sufficient mounting space for disposing the structure such as the control panel; due to the existence of the mounting side plates 25, the assembly fit between the mounting base 24 and the machine mounting part 12 can be facilitated, and the mounting and fixing of the mounting base 24 in the machine mounting part 12 are achieved without affecting the mounting and fixing of the structure such as the control panel. By respectively disposing one of the mounting side plates 25 on the two opposite sides of the mounting base 24 and enabling the mounting side plates 25 to protrude in a direction away from the mounting base 24, assembly spaces can be formed on two sides of the mounting side plates 25 while the mounting and fixing of the mounting base 24 are achieved by the mounting side plates 25, so that the mounting of the structure such as the control panel is achieved, and the structure is set to be more reasonable.

The mounting base 24 cooperates with the machine mounting part 12 by the mounting side plates 25, and therefore, the edges on the sides, away from the mounting base 24, of the mounting side plates 25 are provided with the first elastic bosses 26, the mounting base 24 may form the multi-point elastic contact with the inner wall of the machine mounting part 12 only by the first elastic bosses 26, but other positions cannot be in contact with the machine mounting part 12, which ensures that the vibration of each of the sonic motor and the fluid mechanism 8 can only be transmitted to the machine mounting part 12 by the first elastic bosses 26 after being transmitted to the mounting base 24, so that the damping effect of the mounting rack 14 can be further improved and the damping noise can be reduced.

In one embodiment, through grooves 27 passing through each of the mounting side plates 25 in a thickness direction are formed in the mounting side plates 25, and connecting arms 28 located on sides, away from the mounting base 24, of the through grooves 27 protrude in a direction away from the mounting base 24 to form the first elastic bosses 26.

In this embodiment, the through grooves 27 are elongated grooves extending in the length directions of the mounting side plates 25, the connecting arms 28 are formed on outer sides of the elongated grooves, and the connecting arms 28 protrude outwards on middle positions to form the first elastic bosses 26. The connecting arms 28 are of elastic structures with uniform thicknesses and outwards form arc-shaped protrusions on the middle positions; and the arc-shaped protrusions are located on the connecting arms 28, the connecting arms 28 are located on outer sides of the through grooves 27, the connecting arms 28 are easier to deform, great in deformation and capable of more effectively absorbing and digesting vibration energy by virtue of its deformation, and therefore, the damping effect can be further improved.

In one embodiment, the inner wall of the machine mounting part 12 is provided with mounting grooves 29 extending in a mounting direction of the mounting rack 14, and the mounting side plates 25 are clamped in the mounting grooves 29.

In this embodiment, by disposing the mounting grooves 29 in the inner wall of the machine mounting part 12, a guide structure can be formed, so that it is convenient to mount the mounting rack 14 into the machine mounting part 12 from an open side of the machine mounting part 12, the mounting difficulty is lowered, and the mounting efficiency is increased.

In this embodiment, the two opposite inner walls of the machine mounting part 12 are respectively provided with the mounting grooves 29, so that a more balanced and reliable mounting guiding and supporting structure can be formed.

The mounting grooves 29 may be formed in the following ways: the inner wall of the machine mounting part 12 is provided with two guide plates extending in the mounting direction of the mounting rack 14, the two guide plates extend from one end to the other end of the machine mounting part 12, and the mounting grooves 29 are formed between the two guide plates.

By disposing the mounting grooves 29, the mounting rack 14 can be guided and constrained by the mounting grooves 29 when being mounted, and a good locating effect can be achieved after the mounting rack 14 is mounted in place.

In one embodiment, two opposite side walls of each of the mounting side plates 25 are provided with second elastic bosses 30 protruding towards side walls of the mounting grooves 29, and multi-point elastic contact is formed between the mounting side plates 25 and the side walls of the mounting grooves 29 by the second elastic bosses 30.

In this embodiment, after the mounting grooves 29 are disposed, surface contact is formed between the mounting side plates 25 and side walls of the mounting grooves 29, which can improve the vibration transmission effect to cause the lowering of the damping effect; and in order to avoid such a problem, multi-point elastic contact can be formed between the two side walls of the mounting side plates 25 and the side walls of the mounting grooves 29 in a way of disposing the second elastic bosses 30 on the two side walls, cooperate with the mounting grooves 29, of the mounting side plates 25, so that the vibration transmission action between the mounting side plates 25 and the side walls of the mounting grooves 29 is reduced, the vibration transmission effect between the mounting side plates 25 and the side walls of the mounting grooves 29 is weakened, and the multi-point elastic contact is formed between the mounting rack 14 and the machine mounting part 12 on the whole to play a more effective damping effect.

In one embodiment, arc-shaped protrusions are formed on the surfaces of both the first elastic bosses 26 and the second elastic bosses 30, so that it can be more effectively ensured that point contact or line contact is formed between the mounting rack 14 and the machine mounting part 12 by the first elastic bosses 26 and the second elastic bosses 30, the contact area between the mounting rack 14 and the machine mounting part 12 can be reduced, the vibration transmission effect can be weakened, and the damping effect can be improved.

In one embodiment, the front damping cushion 22 has a damping plane 31, an inner wall of the machine mounting part 12 is provided with first strip-shaped walls 32 protruding towards the damping plane 31, the first strip-shaped walls 32 are tightly pressed and fitted to the damping plane 31.

In this embodiment, in a way of disposing the first strip-shaped walls 32 on the inner wall of the machine mounting part 12, the damping plane 31 of the front damping cushion 22 can cooperate with the machine mounting part 12 by the first strip-shaped walls 32; in a way of extruding the damping plane 31 by the first strip-shaped walls 32, the mounting and fixing effects of the machine mounting part 12 on the front damping cushion 22 can be guaranteed, and then, the mounting and fixing effects for the sonic motor are achieved by the front damping cushion 22; and furthermore, by contact between the first strip-shaped walls 32 and the damping plane 31, the contact area between the machine mounting part 12 and the front damping cushion 22 is reduced, the vibration transmission action is lowered, the damping effect of the sonic motor is improved, the phenomenon that the sonic motor is loosened and damaged during work is avoided, and the service life of the sonic motor is guaranteed.

In one embodiment, the rear damping cushion 23 is provided with a damping boss 33 on a side where the damping plane 31 is located, the inner wall of the machine mounting part 12 is provided with second strip-shaped walls 34 protruding towards the damping boss 33, and the second strip-shaped walls 34 are tightly pressed and fitted to the damping boss 33.

In this embodiment, two first strip-shaped walls 32 and two second strip-shaped walls 34 are provided, wherein the two first strip-shaped walls 32 are located on outer sides of the two second strip-shaped walls 34; and since the cooperation between the machine mounting part 12 and the damping plane 31 is achieved by the two first strip-shaped walls 32 located on the two sides, it can be ensured that stresses on two sides are balanced, and the overall structural stability is higher.

The two second strip-shaped walls 34 are tightly pressed on the damping boss 33, so that the rear damping cushion 23 can cooperate with the two second strip-shaped walls 34 to achieve the mounting and fixing of a rear end of the sonic motor, and meanwhile, the damping of the sonic motor can be achieved by virtue of the damping effect of the rear damping cushion 23. Due to the existence of the damping boss 33, the supporting height of the rear damping cushion 23 is different from that of the damping plane 31, and therefore, the first strip-shaped walls 32 and the second strip-shaped walls 34 are different in height; in this way, the first strip-shaped walls 32 and the second strip-shaped walls 34 can form good adaption relationships with cooperation structures, meanwhile, the vibration action is transmitted more dispersedly, and the damping effect is better.

Due to the cooperation between both the front damping cushion 22 and the rear damping cushion 23, a more comprehensive supporting structure can be formed for the sonic motor, meanwhile, the direct contact between the sonic motor and the machine mounting part 12 can be more effectively avoided, and thus, a better damping effect is formed for the sonic motor.

In one embodiment, the damping boss 33 is provided with limiting grooves, and two second strip-shaped walls 34 are provided, wherein an edge of one of the second strip-shaped walls 34 is fitted to a wall of each of the limiting grooves, and an edge of the other second strip-shaped wall 34, is fitted to the other wall of each of the limiting grooves.

In this embodiment, the two second strip-shaped walls 34 are constrained in the limiting grooves, and the limiting grooves can cooperate with the second strip-shaped walls 34 to more effectively limit the rear damping cushion 23, thereby preventing the rear damping cushion 23 from moving relative to the second strip-shaped walls 34 during work and guaranteeing the damping effect of the rear damping cushion 23.

In one embodiment, on a side opposite to the damping plane 31, two side edges of both the front damping cushion 22 and the rear damping cushion 23 are provided with supporting planes 35, the inner wall of the machine mounting part 12 is provided with third strip-shaped walls 36 protruding towards the supporting planes 35, and the third strip-shaped walls 36 are tightly pressed and fitted to the supporting planes 35 of both the front damping cushion 22 and the rear damping cushion 23.

In this embodiment, the third strip-shaped walls 36 are located on opposite sides of the first strip-shaped walls 32 and the second strip-shaped walls 34, and the front damping cushion 22 can be tightly pressed and fixed from the other side of the front damping cushion 22, so that the sonic motor is tightly pressed and fixed in a direction perpendicular to the mounting side plates 25; and by cooperation with the limiting effects of the mounting side plates 25, the omnidirectional damping and limiting for the sonic motor can be achieved, the phenomenon that the sonic motor is loosened and damaged during work is effectively avoided, and the long-term stable and reliable operation of the sonic motor is guaranteed.

In one embodiment, the front damping cushion 22 is provided with a plurality of spacing ribs on a side where the supporting plane 35 of the front damping cushion 22 is located, and line passing channels are formed between the adjacent spacing ribs.

The fluid mechanism 8 includes a casing 37 and a fluid pump 38 located in the casing 37, the fluid pump 38 is located between the fluid inlet 9 and the fluid outlet 10, the fluid inlet 9 communicates with a suction inlet of the fluid pump 38, and the fluid outlet 10 communicates with a pump outlet of the fluid pump 38.

In this embodiment, the fluid pump 38 can provide power for the flow of water and facilitate pumping the water from the water storage cavity 13 to the axial channel 5 of the power output shaft 4, thereby delivering the water by the axial channel 5. For such a structure, an internal structure of the machine mounting part 12 is sufficiently utilized, meanwhile, the power output shaft 4 located in the motor body 3 is utilized to form the fluid channel, and it is unnecessary to increase an additional guide pipe to guide water, so that the structural assembly is simpler, the structure is more compact, fewer structural components are required, the cost is lower, moreover, the overall size of the handle cannot be increased, and the hand-holding comfort level is higher.

In one embodiment, the fluid pump 38 is a diaphragm pump which is simple in structure, convenient to mount and few in quick-wear parts. The fluid pump 38 can also be a centrifugal pump or a gear pump.

An outlet end of the fluid mechanism 8 is provided with a fluid delivery shaft 39, the fluid delivery shaft 39 is provided with a fluid channel 21, the fluid channel 21 communicates with the fluid outlet 10, and the fluid delivery shaft 39 communicates with the power output shaft 4 by a connector 40.

The connector 40 has a communication cavity 41, a first end facing the power output shaft 4 and a second end facing the fluid mechanism 8, a first end of the power output shaft 4 extends into the first end of the connector 40, and an end of the fluid mechanism 8 where the fluid outlet 10 is located extends into the second end of the connector 40.

In this embodiment, the first end of the power output shaft 4 extends into the first end of the connector 40, the end of the fluid mechanism 8 where the fluid outlet 10 is located extends into the second end of the connector 40, and the power output shaft 4 and the fluid mechanism 8 are connected by the connector 40, in this way, the fluid in the fluid mechanism 8 can flow into the axial channel of the power output shaft 4 by the communication cavity 41 and then flows out along the axial channel to enter the rinsing head so as to provide a water source for the rinsing head.

The communication cavity 41 includes a first communication segment 42 communicating with the first inlet 6 and a second communication segment 43 communicating with the fluid outlet 10, the first communication segment 42 communicates with the second communication segment 43, an end part of the first communication segment 42 is provided with a first sealing groove 44, an end part of the second communication segment 43 is provided with a second sealing groove 45, and each of the first sealing groove 44 and the second sealing groove 45 is provided with a sealing element 46 therein.

In this embodiment, the first inlet 6 communicates with the first communication segment 42, and the fluid outlet 10 communicates with the second communication segment 43, in this way, the fluid in the fluid mechanism 8 can flow from the fluid outlet 10 to the second communication segment 43, then flow from the second communication segment 43 to the first communication segment 42, and finally enter the first inlet 6 from the first communication segment 42, and thus, the delivery of the fluid from the fluid mechanism 8 to the power output shaft 4 is achieved. Each of the first sealing groove 44 and the second sealing groove 45 is provided with the sealing element 46 therein by which a gap between the first end of the power output shaft 4 and the first communication segment 42 and a gap between the fluid mechanism 8 and the second communication segment 43 can be sealed to form a sealed fluid delivery channel, so that the situation that the fluid flows out of the gap between the first end of the power output shaft 4 and the first communication segment 42 and the gap between the fluid mechanism 8 and the second communication segment 43 to result in short circuit or water damage of components inside the handle part in a process that the fluid flows from the fluid mechanism 8 to the axial channel is avoided.

The first communication segment 42 and the second communication segment 43 are disposed in a staggered manner, the connector 40 is provided with an avoidance groove 47 on one side of the first communication segment 42, the connector 40 is provided with adjusting grooves 48 on two opposite sides of the second communication segment 43, and the connector 40 has the same wall thickness on both sides of each of the adjusting grooves 48.

In this embodiment, both the first communication segment 42 and the second communication segment 43 extend in the extension direction of the output axis so as to be simpler in structure, and they can be more adapted to the layout of axial structures of the power output shaft 4 and the fluid mechanism 8, thereby facilitating achieving the connection and communication between the connector and each of the power output shaft 4 and the fluid mechanism 8. The first communication segment 42 and the second communication segment 43 are disposed coaxially or in a staggered manner and can cooperate with a structure that the motor is not coaxial with the fluid delivery shaft 39 of the fluid mechanism 8, so that the adaptability is better, the connection between different sonic motors and the fluid mechanism 8 can also be satisfied, and the applicability of the connector 40 is improved.

In one embodiment of the present disclosure, when the first communication segment 42 and the second communication segment 43 are disposed in a staggered manner, the connector 40 is provided with the avoidance groove 47 on one side of the first communication segment 42, the connector 40 is provided with adjusting grooves 48 on two opposite sides of the second communication segment 43, and the connector 40 has the same wall thickness on both sides of each of the adjusting grooves 48.

In this embodiment, when the first communication segment 42 and the second communication segment 43 are disposed in a staggered manner, the connector 40 is provided with the avoidance groove 47 on one side of the first communication segment 42 to avoid interference to the mounting of other parts.

The connector 40 has the same wall thickness on both sides of each of the adjusting grooves 48, which not only can avoid collapse and deformation caused by a too large wall thickness during injection molding of the connector 40, but also can ensure that the connector 40 has good elastic deformation on two sides of the adjusting grooves 48 so as to be better in adaptability.

The care head part 2 further includes a connecting structure 49 configured to be capable of transmitting a driving force of the power output shaft 4 to the rinsing stem 17, the connecting structure 49 is disposed on an end, away from the brush head 18, of the rinsing stem 17 and is capable of being in snap-fitted with the power output shaft 4 to limit the axial movement of the power output shaft 4 relative to the rinsing stem 17.

In the above-mentioned technical solutions, compared with an electric toothbrush which is only required to satisfy vibration transmission or a tooth rinser which is only required to take a hydraulic impact force into account in the prior art, this embodiment has the advantages that by disposing the connecting structure 49, the connecting structure 49 may transmit the driving force of the power output shaft 4 to the rinsing stem 17 to ensure that vibration is transmitted to the rinsing stem 17, thereby achieving a tooth cleaning function of the electric toothbrush by virtue of the vibration of the sonic motor; moreover, the connecting structure 49 is snap-fitted with the power output shaft 4 so as to be further capable of limiting the axial displacement of the power output shaft 4 relative to the rinsing stem 17, in this way, the problem that the power output shaft 4 is detached from the rinsing stem 17 due to the hydraulic impact force can be avoided, and thus, a shaking force transmitted by the power output shaft 4 can be more stably transmitted to the rinsing stem 17; furthermore, the oral care device in this embodiment not only has the tooth brushing function of the electric toothbrush, but also has the rinsing function of the tooth rinser, so that the experience of a user is improved, and the cleaning effect of the oral care device is improved. Therefore, the oral care device in this embodiment has a synchronous rinsing function.

Specifically, in an embodiment of the present disclosure, by disposing the axial channel 5 on the power output shaft 4 for transmitting power and disposing the fluid channel 21 and the spray nozzle 20 communicating with the fluid channel 21 on the rinsing stem 17, the fluid may be sprayed out of the spray nozzle 20 after flowing through the axial channel 5 and the fluid channel 21 in sequence, so that a function of rinsing the oral cavity by the fluid sprayed out of the spray nozzle 20 can also be achieved while or after tooth brushing.

Specifically, in this embodiment, the power output shaft 4 is provided with the axial channel 5 parallel to the output axis, in this way, when a fluid on the incoming flow side reaches a position where the sonic motor is located, a pipe is not needed to be disposed outside the sonic motor, but can be directly connected to the power output shaft 4 of the sonic motor, so that the fluid can be delivered by the axial channel 5 of the power output shaft 4, and thus, the fluid passes through the inside of the power output shaft 4 inside the sonic motor; it is unnecessary to perform other variations in a structure of a product, i.e. additionally disposing a delivery pipeline to deliver the fluid is avoided, no additional space is occupied, and the structure of the sonic motor can be more sufficiently and reasonably utilized, so that the structural layout of a rinsing flow path is more reasonable, fluid pipelines are reduced, the occupied space is saved, and the oral care device is smaller in overall size and lighter in weight; and the handle part is more convenient to hold with a hand.

It should be noted that, in an embodiment of the present disclosure, the fluid flows from the power output shaft 4 to the fluid channel 21 of the rinsing stem 17, and the high-pressure fluid can generate a water flow impact force for a tail end of the power output shaft 4, in this way, the power output shaft 4 in FIG. 1 is easily detached from the rinsing stem 17. In this embodiment, such a problem can be solved by disposing the connecting structure 49.

The periphery of the power output shaft 4 is provided with a clamping groove 50 extending in the circumferential direction of the power output shaft 4, the connecting structure 49 includes: a connecting support 51 having an internal through hole parallel to the output axis, wherein the power output shaft 4 can be inserted in the internal through hole; and a clamping piece 52 disposed on the connecting support 51, the clamping piece 52 including two clamping arms 53 spaced apart in the radial direction of the power output shaft 4, and the two clamping arms 53 having a clamping position, in which the two clamping arms 53 are close to each other and become snap-fitted with the clamping groove 50 and an unclamping position, in which the two clamping arms 53 are away from each other and become not snap-fitted with the clamping groove 50.

By the above arrangement, when the power output shaft 4 is inserted in the internal through hole and between the two clamping arms 53, the two clamping arms 53 may be away from each other under the action of the power output shaft 4 until the clamping groove 50 of the power output shaft 4 moves to positions corresponding to the clamping arms 53, the two clamping arms 53 may be close to each other and clamped into the clamping groove 50 to limit the axial displacement of the power output shaft 4 relative to the connecting support 51, in this way, the problem that the power output shaft 4 is detached from the rinsing stem 17 due to the hydraulic impact force can be avoided, the shaking force transmitted by the power output shaft 4 can be more stably transmitted to the rinsing stem 17, and thus, the oral care device in this embodiment not only has the tooth brushing function of the electric toothbrush, but also has the rinsing function of rinsing teeth.

Figure 7:
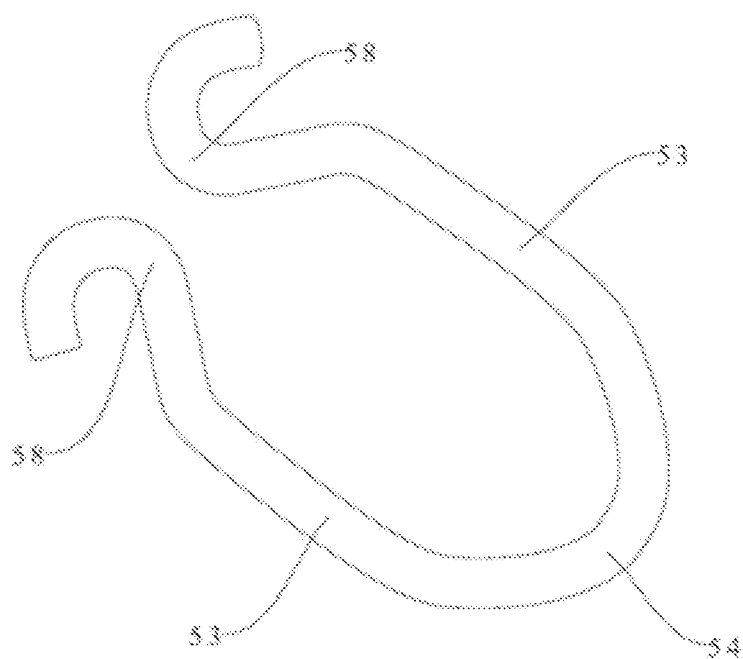
FIG. 7 shows a schematic structural view of a clamping piece of the connecting structure in FIG. 4.
Figure 8:
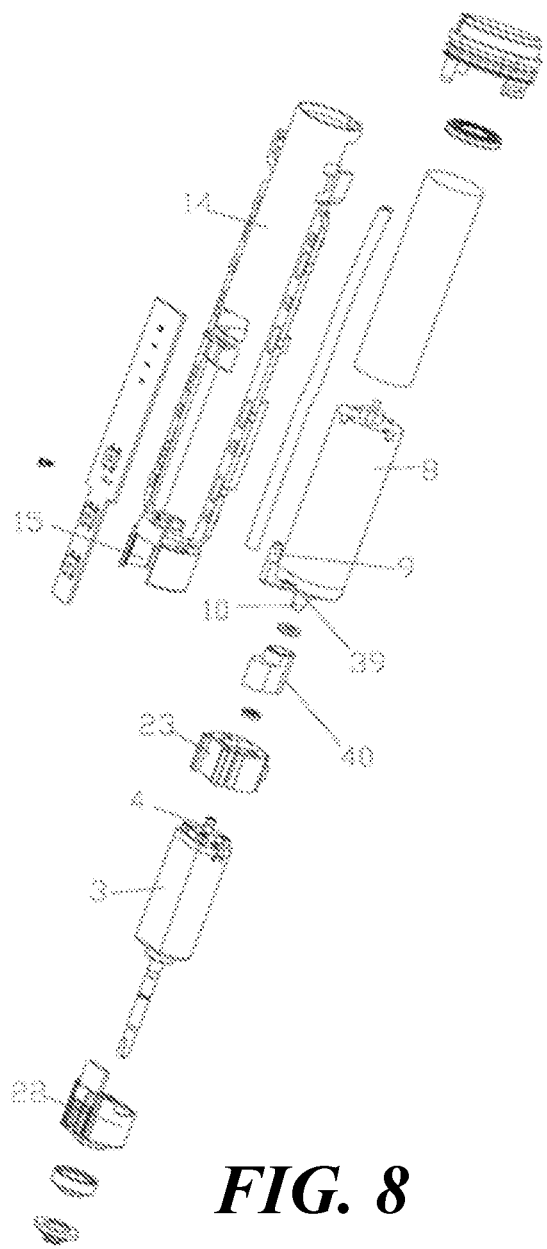
FIG. 8 shows a schematic view showing an exploded structure of a machine of the oral care device in an embodiment of the present disclosure.
Figure 9:
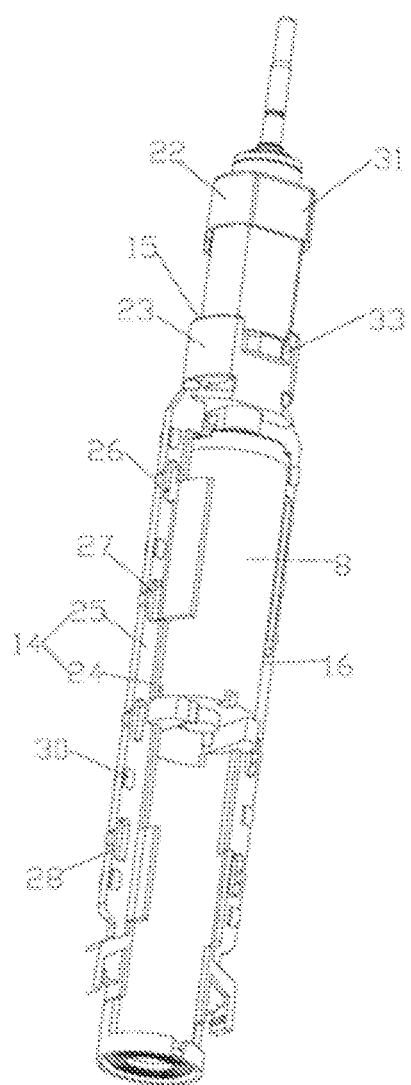
FIG. 9 shows a first axonometric view of the machine of the oral care device in an embodiment of the present disclosure.
Figure 10:
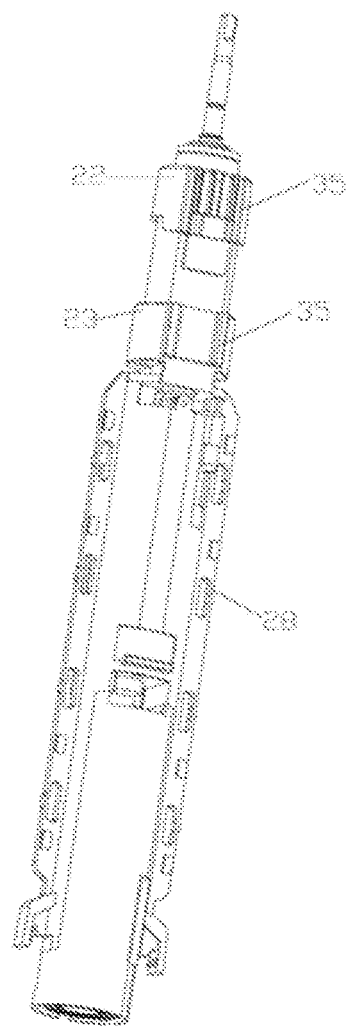
FIG. 10 shows a second axonometric view of the machine of the oral care device in an embodiment of the present disclosure.
Figure 11:
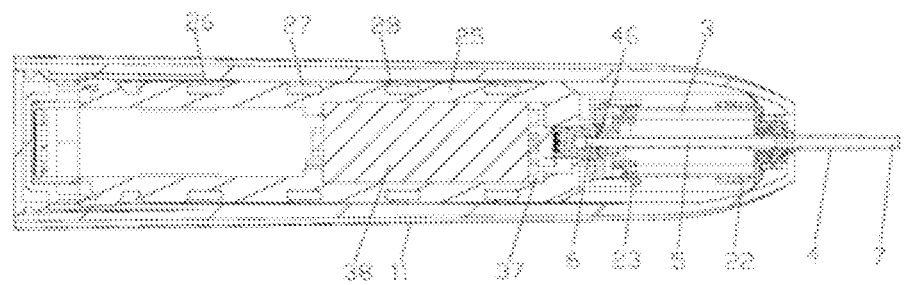
FIG. 11 shows a schematic view showing an internal structure of a handle of the oral care device in an embodiment of the present disclosure.
Figure 12:
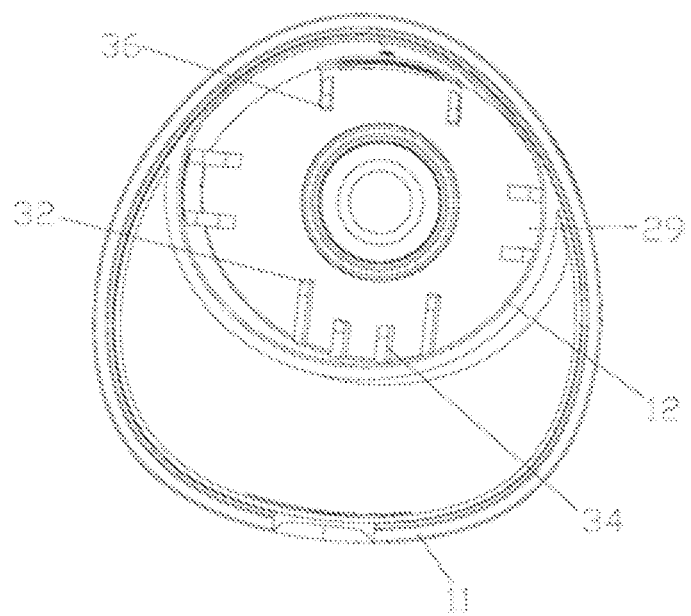
FIG. 12 shows a schematic structural view of a machine mounting part of the handle of the oral care device in an embodiment of the present disclosure.
Figure 13:
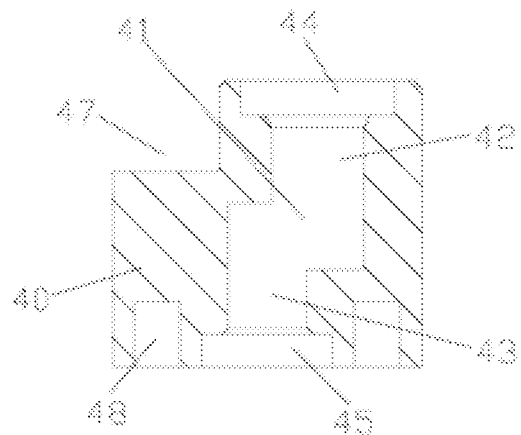
FIG. 13 shows a schematic view showing a sectional structure of a connector of the handle of the oral care device in an embodiment of the present disclosure.
Figure 14:
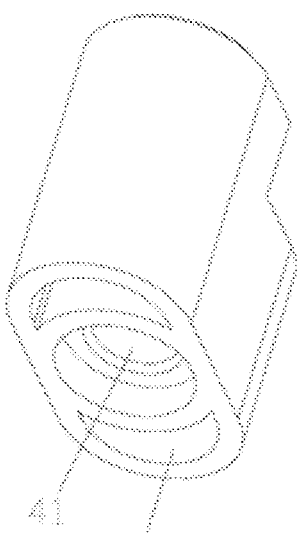
FIG. 14 shows a schematic view showing a three-dimensional structure of the connector of the handle of the oral care device in an embodiment of the present disclosure.

As shown in FIG. 7, in an embodiment of the present disclosure, the clamping piece 52 further includes an elastic arm 54 for connecting the two clamping arms 53 so that the two clamping arms 53 can be switched from the unclamping position to the clamping position.

By the above arrangement, when the power output shaft 4 is put into the internal through hole, the two clamping arms 53 can be strutted under the action of an assembly force of the power output shaft 4, the elastic arm 54 deforms until the clamping groove 50 of the power output shaft 4 moves to positions corresponding to the clamping arms 53, then, the elastic arm 54 is recovered from deformation to drive the two clamping arms 53 to be close to each other so as to be clamped into the clamping groove 50, so that the power output shaft 4 is prevented from axially moving relative to the connecting support 51. In this way, the problem that the power output shaft 4 is detached from the rinsing stem 17 due to the hydraulic impact force can be avoided.

Further, the elastic arm 54 has elasticity, and when the power output shaft 4 is required to be dismounted from the rinsing stem 17, a user can pull the power output shaft 4 out of the internal through hole by using a force greater than the water flow impact force, in this way, the elastic arm 54 may deform to drive the two clamping arms 53 to be away from each other so that the clamping arms 53 are detached from the clamping groove 50. In this way, when the brush head 18 is required to be replaced due to abrasion after being used for a long time, by using the above-mentioned structure, quick dismounting can be achieved, and it is convenient for a user to replace the care head part 2 in time.

Preferably, in an embodiment of the present disclosure, an inner wall of the clamping groove 50 and a side wall of the power output shaft 4 are connected by an arc-shaped transition segment, in this way, when the power output shaft 4 is mounted, the clamping arms 53 can be more smoothly slid into the clamping groove 50 from the side wall of the power output shaft 4, and when the power output shaft 4 is dismounted, the clamping arms 53 can be more smoothly slid out of the clamping groove 50.

In an alternative embodiment, there may also be only two clamping arms 53 made of an elastic material, in this way, the two clamping arms 53 may be away from each other under the action of the power output shaft 4, and when the clamping groove 50 of the power output shaft 4 moves to the positions corresponding to the clamping arms 53, the two clamping arms 53 may be recovered from deformation and close to each other so as to be clamped into the clamping groove 50.

As shown in FIG. 2, FIG. 4, FIG. 5 and FIG. 6, in an embodiment of the present disclosure, the connecting support 51 is provided with a mounting via groove 55 communicating with the internal through hole, and the mounting via groove 55 passes through the connecting support 51 in the radial direction of the power output shaft 4; and inner walls on circumferential sides of the mounting via groove 55 are in clearance fit with the clamping arms 53.

By the above arrangement, the clamping piece 52 can be mounted in the mounting via groove 55, and the two clamping arms 53 can be exposed from the internal through hole and clamped to the clamping groove 50; and further, inner walls on circumferential sides of the mounting via groove 55 are in clearance fit with the clamping arms 53, in this way, the inner walls on the circumferential sides of the mounting via groove 55 can limit ultimate displacements of the clamping arms 53 to avoid invalidation caused by greater deformation of the elastic arm 54 in a process that the two clamping arms 53 are away from each other.

Figure 5:
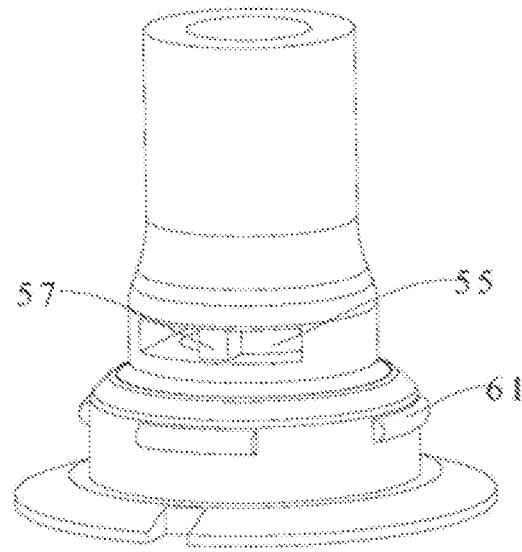
FIG. 5 shows a schematic structural view of a connecting support of the connecting structure in FIG. 4.
Figure 6:
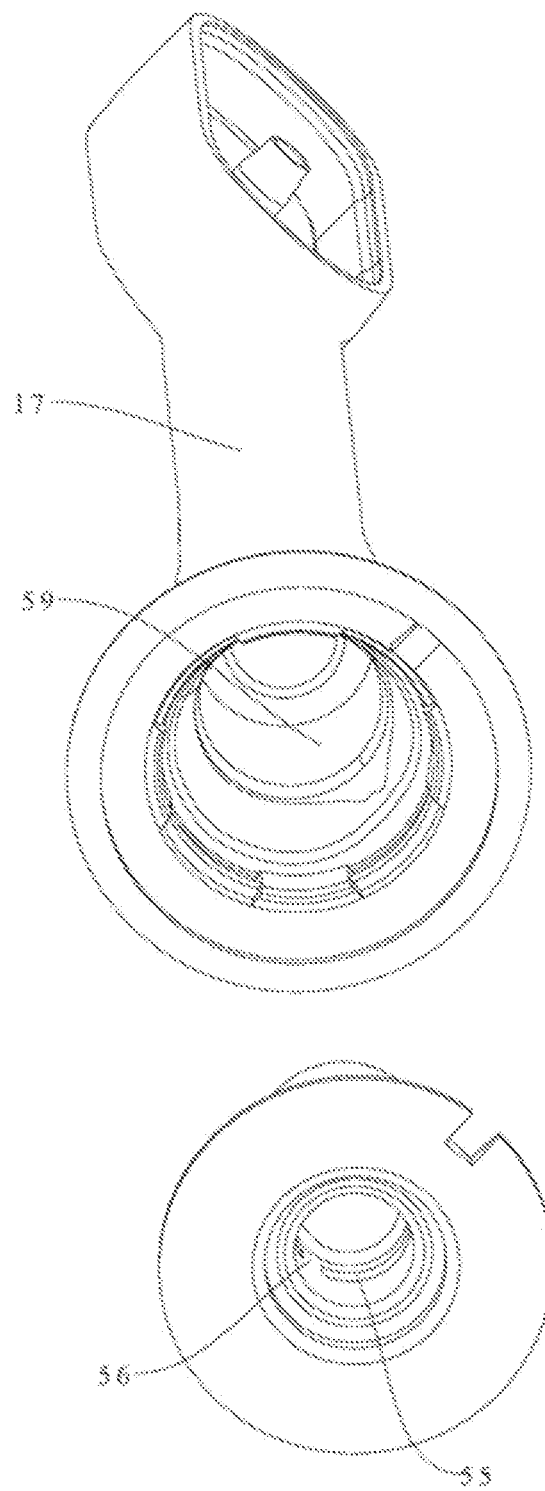
FIG. 6 shows a schematic view showing an exploded structure of the connecting support and the rinsing stem of the oral care device in FIG. 1.

Specifically, in an embodiment of the present disclosure, a width of the mounting via groove 55 on a horizontal plane in FIG. 5 is greater than an internal diameter of the internal through hole, in this way, the inner walls on the circumferential sides of the mounting via groove 55 can be in clearance fit with the clamping arms 53.

Figure 2:
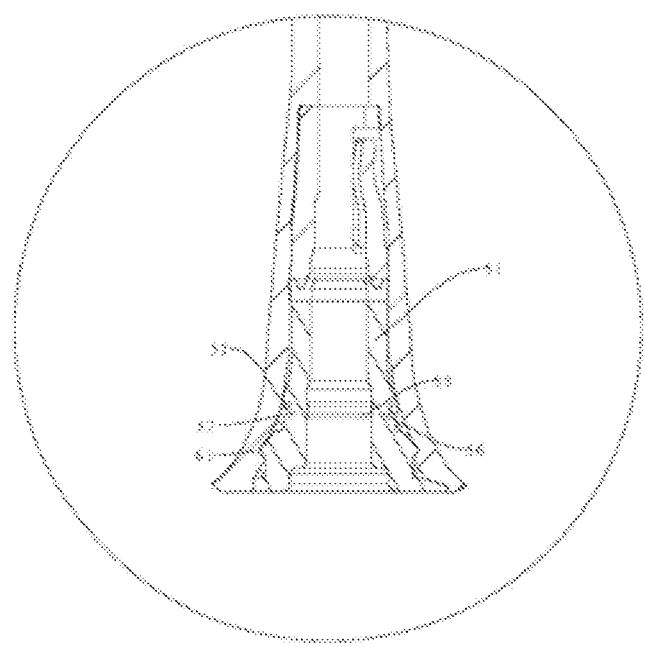
FIG. 2 shows a partial enlarged view of the oral care device in FIG. 1.

As shown in FIG. 2 and FIG. 7, in an embodiment of the present disclosure, the clamping piece 52 further includes an elastic arm 54 for connecting the two clamping arms 53, the connecting structure 49 further includes a retaining rib 56 connected to the connecting support 51, one end of the mounting via groove 55 is provided with the retaining rib 56, and the elastic arm 54 is partially located on a side, facing away from the internal through hole, of the retaining rib 56 so that the displacement of the elastic arm 54 is constrained thereby.

In the above-mentioned technical solutions, when the clamping piece 52 is mounted in the mounting via groove 55, the retaining rib 56 can limit displacement of the elastic arm 54 to avoid a situation that the power output shaft 4 penetrates in or out of the internal through hole to bring the elastic arm 54 into the internal through hole, so that a situation that the dismounting or mounting of the power output shaft 4 is affected by the elastic arm 54 entering the internal through hole is avoided.

Figure 4:
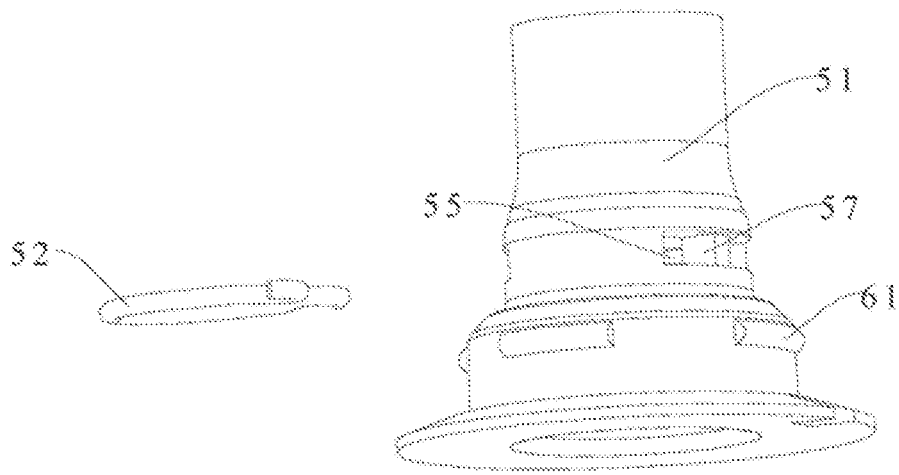
FIG. 4 shows a schematic structural view of a connecting structure of the oral care device in FIG. 1.

As shown in FIG. 2 and FIG. 4, in an embodiment of the present disclosure, the connecting structure 49 further includes a locating rib 57 disposed on the other end of the mounting via groove 55, the clamping piece 52 further includes two locating arms 58 respectively connected to the two clamping arms 53, and the two locating arms 58 are spaced apart and are located on two sides of the locating rib 57.

By the above arrangement, on one hand, the locating rib 57 can locate the two locating arms 58, and the locating rib 57 can ensure that the clamping piece 52 is located on the same position of the mounting via groove 55 during the dismounting or mounting of the power output shaft 4, so that a situation that the power output shaft 4 penetrates in or out of the internal through hole to result in position deviation of the clamping piece 52 can be avoided, and then, the power output shaft 4 can be dismounted or mounted conveniently and quickly; and on the other hand, the locating rib 57 can strut the two locating arms 58, so that a spacing between the two clamping arms 53 allows the power output shaft 4 to penetrate in.

Preferably, in an embodiment of the present disclosure, the retaining rib 56 and the locating rib 57 are symmetrically disposed with respect to an axis of the internal through hole of the connecting support 51, in this way, any one of the locating rib 57 and the retaining rib 56 can limit the displacement of the elastic arm 51 or locate the clamping piece 52, thereby facilitating machining.

Preferably, in an embodiment of the present disclosure, the clamping piece 52 is a U-shaped clamping spring, and of course, may also be other forms of springs.

The rinsing stem 17 is provided with a mounting through hole 59 communicating with the fluid channel 21, a step surface is disposed between the mounting through hole 59 and the fluid channel 21, and the connecting structure 49 is located in the mounting through hole 59 and is constrained between the step surface and an end face of the housing 11.

The care head part 2 further includes a limiting groove 60 disposed in the rinsing stem 17 and a limiting rib 61 disposed on the connecting support 51 of the connecting structure 49, the limiting groove 60 communicates with the mounting through hole 59, and the limiting rib 61 is constrained by and cooperates with the limiting groove 60.

By the above arrangement, the connecting structure 49 can be mounted in the rinsing stem 17, and the displacement of the connecting structure 49 in an axis direction of the mounting through hole 59 can be constrained, in this way, when the connecting structure 49 transmits power, axial movement of the connecting structure 49 can be avoided, so that the experience of a user is improved.

In an alternative embodiment, it is also possible to additionally provide a cylindrical structure between the rinsing stem 17 and the housing 11, and the connecting structure 49 is mounted in the cylindrical structure as long as power transmission can be achieved.

Figure 3:
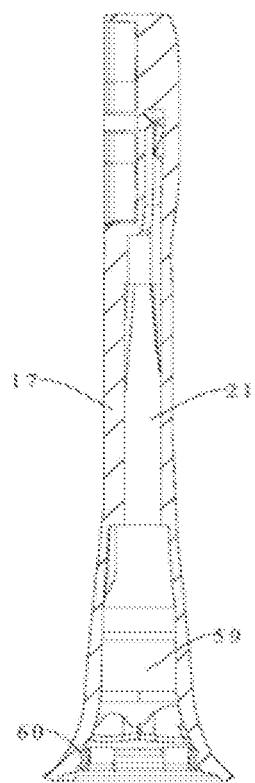
FIG. 3 shows a schematic structural view of a rinsing stem of the oral care device in FIG. 1.

As shown in FIG. 3 and FIG. 4, in an embodiment of the present disclosure, the care head part 2 further includes the limiting groove disposed in the rinsing stem 17 and the limiting rib 61 disposed on the connecting support 51, the limiting groove communicates with the mounting through hole 59, and the limiting rib 61 is constrained by and cooperates with the limiting groove 60.

By the above arrangement, when the connecting support 51 is mounted in the mounting through hole 59, the limiting rib 61 is constrained by and cooperates with the limiting groove, so that the displacement of the connecting support 51 in the axis direction of the mounting through hole 59 can be constrained. In this way, when the connecting structure 49 transmits power or the care head part 2 is placed as an independent accessory, the axial movement of the connecting structure 49 can be avoided, and thus, the experience of a user can be improved.

Preferably, in an embodiment of the present disclosure, the care head part 2 includes a plurality of limiting grooves and a plurality of limiting ribs 61 correspondingly cooperating with the plurality of limiting grooves, and the plurality of limiting grooves are spaced apart around the axis of the mounting through hole 59, in this way, an effect of avoiding axial movement can be improved.

It should be noted that the limiting grooves can be loop-closed annular grooves extending in a circumferential direction, and can also be grooves disposed in the inner wall of the rinsing stem 17.

As shown in FIG. 2 and FIG. 3, in an embodiment of the present disclosure, transition pieces are disposed on connections of side walls of the limiting grooves and an inner wall of the mounting through hole 59, the transition pieces are located on sides, facing the housing 11, of the limiting grooves, and the transition pieces have arc-shaped curved surfaces protruding towards a side where the axis of the mounting through hole 59 is located so as to be smoothly connected to the side walls of the limiting grooves and the inner wall of the mounting through hole 59.

In the above-mentioned technical solutions, the transition pieces with the arc-shaped curved surfaces are disposed, in this way, the connecting support 51 is convenient to mount by virtue of the elastic deformation of the transition pieces, so that the limiting ribs 61 can slide into the limiting grooves, and the transition pieces can also limit the limiting ribs 61 to avoid the situation that the connecting support 51 is detached from the mounting through hole 59 under the influence of the gravity.

It should be noted that terms used herein are merely intended to describe specific implementations, rather than to limit exemplary implementations of the present application. For example, a singular form used herein is also intended to include a plural form unless the context expressly indicates otherwise. Furthermore, it should be further understood that, when a term "including" and/or "comprising" is used in the present description, it shows that there are features, steps, operations, devices, components and/or combinations thereof.

It should be noted that terms such as "first" and "second" in the description and claims of the present application and the above-mentioned accompanying drawings are used for distinguishing similar objects, but are unnecessarily used for describing a specific sequential or chronological order. It should be understood that data used in such a way are interchangeable under appropriate circumstances, such that the implementations of the present application described herein can be implemented in other sequences than illustrated or described herein.

The above descriptions are merely preferred embodiments of the present disclosure, and are not intended to limit the present disclosure. For those skilled in the art, various alterations and variations can be made to the present disclosure. Any modifications, equivalent replacements, improvements, etc. made within the spirit and principle of the present disclosure should fall within the protection scope of the present disclosure.

What is claimed is:

1. An oral care device, comprising a handle part and a care head part; wherein the handle part is configured to be suitable for hand-holding and comprises:
   a sonic motor comprising a motor body and a power output shaft, the motor body having an output axis extending in a power output direction; the power output shaft being a columnar object extending along the output axis and passing through the motor body, the power output shaft being configured to cooperate with the motor body and transmit output power from the motor body and having an axial channel parallel to the output axis as well as a first inlet and a first outlet communicating with the axial channel;
   a fluid mechanism provided with a fluid inlet and a fluid outlet, the fluid outlet communicating with the first inlet; and
   a housing extending in the axial direction of the power output shaft and forming a cylindrical structure of which an inside is hollow, the housing comprising a machine mounting part and a water storage cavity, the machine mounting part being internally provided with a mounting rack, the mounting rack having a motor compartment and a pump body compartment, the sonic motor being mounted in the motor compartment, the fluid mechanism being mounted in the pump body compartment, and a head of the machine mounting part being provided with a mounting shaft hole which allows the power output shaft to penetrate through and is in an assembly fit with the power output shaft;
   wherein the care head part is provided with a rinsing stem parallel to the output axis and a brush head disposed on a head of the rinsing stem, the rinsing stem is mounted on the power output shaft, the brush head comprises bristles and a spray nozzle, the bristles extend in a direction which forms a preset included angle with the output axis, and the rinsing stem is provided with a fluid channel capable of communicating the spray nozzle with the axial channel;
   in an extension direction of the output axis, the first outlet of the axial channel is capable of communicating with the fluid channel of the care head part, and during use of the oral care device, water in the water storage cavity can enter the axial channel from the first inlet of the axial channel under an action of the fluid mechanism, flow from a first end to a second end of the motor body via the axial channel, then, enter the fluid channel of the care head part from the first outlet of the axial channel and be sprayed out of the brush head of the care head part;
   the handle part further comprises at least one damping cushion.

2. The oral care device of claim 1, wherein the power output shaft has a Rockwell hardness HRC ranging from 17 to 70 and a single-sided wall thickness ranging from 0.3 mm to 1 mm.

3. The oral care device of claim 1, wherein in a section perpendicular to the output axis, a ratio of a sectional area of the power output shaft to a sectional area of the axial channel ranges from 1.5 to 9, a single-sided wall thickness of the power output shaft ranges from 0.3 mm to 1 mm, and an internal diameter of the axial channel ranges from 0.5 mm to 3 mm.

4. The oral care device of claim 1, wherein the at least one damping cushion further comprises:
   a front damping cushion sleeving on a front end of the sonic motor, the front end of the sonic motor being mounted in the machine mounting part by the front damping cushion; and
   a rear damping cushion sleeving on a rear end of the sonic motor, the rear end of the sonic motor being mounted in the motor compartment by the rear damping cushion;
   wherein multi-point elastic contact is formed between a periphery of the mounting rack and an inner wall of the machine mounting part.

5. The oral care device of claim 4, wherein the mounting rack comprises a mounting base, the mounting base is provided with the motor compartment, two opposite sides of the mounting base are respectively provided with mounting side plates facing away from each other, edges, away from the mounting base, of the mounting side plates are provided with first elastic bosses; and through grooves passing through each of the mounting side plates in a thickness direction are formed in the mounting side plates, and connecting arms located on sides, away from the mounting base, of the through grooves protrude in a direction away from the mounting base to form the first elastic bosses.

6. The oral care device of claim 5, wherein an inner wall of the machine mounting part is provided with mounting grooves extending in a mounting direction of the mounting rack, the mounting side plates are clamped in the mounting grooves, two opposite side walls of each of the mounting side plates are provided with second elastic bosses protruding towards side walls of the mounting grooves, and multi-point elastic contact is formed between the mounting side plates and the side walls of the mounting grooves by the second elastic bosses.

7. The oral care device of claim 4, wherein the front damping cushion has a damping plane, an inner wall of the machine mounting part is provided with first strip-shaped walls protruding towards the damping plane, the first strip-shaped walls are tightly pressed and fitted to the damping plane, the rear damping cushion is provided with a damping boss on a side where the damping plane is located, the inner wall of the machine mounting part is provided with second strip-shaped walls protruding towards the damping boss, and the second strip-shaped walls are tightly pressed and fitted to the damping boss.

8. The oral care device of claim 7, wherein on a side opposite to the damping plane, two side edges of both the front damping cushion and the rear damping cushion are provided with supporting planes, the inner wall of the machine mounting part is provided with third strip-shaped walls protruding towards the supporting planes, and the third strip-shaped walls (36) are tightly pressed and fitted to the supporting planes of both the front damping cushion and the rear damping cushion.

9. The oral care device of claim 1, wherein the fluid mechanism comprises a casing and a fluid pump located in the casing, the fluid pump is located between the fluid inlet and the fluid outlet, the fluid inlet communicates with a suction inlet of the fluid pump, and the fluid outlet communicates with a pump outlet of the fluid pump.

10. The oral care device of claim 9, wherein an outlet end of the fluid mechanism is provided with a fluid delivery shaft, the fluid delivery shaft is provided with a fluid channel, the fluid channel communicates with the fluid outlet, and the fluid delivery shaft communicates with the power output shaft by a connector.

11. The oral care device of claim 10, wherein the connector has a communication cavity, a first end facing the power output shaft and a second end facing the fluid mechanism, a first end of the power output shaft extends into the first end of the connector, and an end of the fluid mechanism where the fluid outlet is located extends into the second end of the connector.

12. The oral care device of claim 11, wherein the communication cavity comprises a first communication segment communicating with the first inlet and a second communication segment communicating with the fluid outlet, the first communication segment communicates with the second communication segment, an end part of the first communication segment is provided with a first sealing groove, an end part of the second communication segment is provided with a second sealing groove, and each of the first sealing groove and the second sealing groove is provided with a sealing element therein.

13. The oral care device of claim 12, wherein the first communication segment and the second communication segment are disposed in a staggered manner, the connector is provided with an avoidance groove on one side of the first communication segment, the connector is provided with adjusting grooves on two opposite sides of the second communication segment, and the connector has a same wall thickness on both sides of each of the adjusting grooves.

14. The oral care device of claim 1, wherein the care head part further comprises a connecting structure configured to be capable of transmitting a driving force of the power output shaft to the rinsing stem, the connecting structure is disposed on an end, away from the brush head, of the rinsing stem and is capable of being snap-fitted with the power output shaft to limit axial movement of the power output shaft relative to the rinsing stem.

15. The oral care device of claim 14, wherein a periphery of the power output shaft is provided with a clamping groove extending in a circumferential direction of the power output shaft, the connecting structure comprises:
a connecting support having an internal through hole parallel to the output axis, wherein the power output shaft can be inserted in the internal through hole; and
a clamping piece disposed on the connecting support, the clamping piece comprising two clamping arms spaced apart in a radial direction of the power output shaft, and the two clamping arms having a clamping position, in which the two clamping arms are close to each other and become snap-fitted with the clamping groove, and an unclamping position, in which the two clamping arms are away from each other and become not snap-fitted with the clamping groove.

16. The oral care device of claim 15, wherein the clamping piece further comprises an elastic arm for connecting the two clamping arms so that the two clamping arms can be switched from the unclamping position to the clamping position.

17. The oral care device of claim 15, wherein the connecting support is provided with a mounting via groove communicating with the internal through hole, and the mounting via groove passes through the connecting support in the radial direction of the power output shaft; and inner walls on circumferential sides of the mounting via groove are in clearance fit with the clamping arms.

18. The oral care device of claim 17, wherein the clamping piece further comprises an elastic arm for connecting the two clamping arms, the connecting structure further comprises a retaining rib connected to the connecting support, one end of the mounting via groove is provided with the retaining rib, and the elastic arm is partially located on a side, facing away from the internal through hole, of the retaining rib so that a displacement of the elastic arm is limited thereby.

19. The oral care device of claim 18, wherein the connecting structure further comprises a locating rib disposed on the other end of the mounting via groove, the clamping piece further comprises two locating arms respectively connected to the two clamping arms, and the two locating arms are spaced apart and are located on two sides of the locating rib.

20. The oral care device of claim 15, wherein the rinsing stem is provided with a mounting through hole communicating with the fluid channel, a step surface is disposed between the mounting through hole and the fluid channel, and the connecting structure is located in the mounting through hole and is constrained between the step surface and an end face of the housing.

* * * * *